United States Patent
Ruhland

[11] Patent Number: 5,601,709
[45] Date of Patent: Feb. 11, 1997

[54] PLATE ASSEMBLY FOR FILTER PRESS

[75] Inventor: Heinz Ruhland, Geislingen, Germany

[73] Assignee: Lensor Kunststoff-Presswerk GmbH + Co.KG, Senden, Germany

[21] Appl. No.: 448,321

[22] Filed: May 23, 1995

[30] Foreign Application Priority Data

Jun. 7, 1994 [DE] Germany .................. 44 19 865.5

[51] Int. Cl.⁶ .................................................. B01D 25/176
[52] U.S. Cl. ........................... 210/228; 210/230; 210/231
[58] Field of Search ........................... 210/224, 227, 210/228, 229, 230, 231, 232

[56] References Cited

U.S. PATENT DOCUMENTS

| | | | |
|---|---|---|---|
| 4,508,623 | 4/1985 | Heckl et al. | 210/229 |
| 4,749,482 | 6/1988 | Bonn | 210/231 |
| 4,997,560 | 3/1991 | Haberle . | |
| 5,051,179 | 9/1991 | Hermann | 210/231 |
| 5,362,388 | 11/1994 | Bonn | 210/230 |
| 5,484,525 | 1/1995 | Bonn | 210/231 |

FOREIGN PATENT DOCUMENTS

WO92/21423 12/1992 European Pat. Off. .
4119166 12/1992 Germany .................. 210/231

*Primary Examiner*—W. L. Walker
*Attorney, Agent, or Firm*—Herbert Dubno; Andrew Wilford

[57] ABSTRACT

A filter-plate assembly has a backing wall having an outwardly directed face and formed with an annular groove opening outward at the face and of a predetermined transverse width and a filter plate adjacent the wall and having an outer peripheral frame set in the groove and of a width substantially less than the width of the groove so as to define therewith an outwardly open annular gap. A generally planar central panel within the frame has a back face turned toward and forming a compartment with the wall and a front face turned away from the wall and adapted to be overlain by a filter cloth. A retaining bar is set in the space and braced transversely between the frame of the element and the backing wall.

10 Claims, 3 Drawing Sheets

5,601,709

PLATE ASSEMBLY FOR FILTER PRESS

FIELD OF THE INVENTION

The present invention relates to a filter press. More particularly this invention concerns a membrane plate assembly for such a filter press.

BACKGROUND OF THE INVENTION

A standard filter press has a plurality of compartments defined between filter plates and each subdivided by a filter cloth or screen into an input compartment and an output compartment. The filter plates have ridged and grooved front surfaces turned toward the filter cloth and forming drainage channels in the respective output compartments. The filtrate is introduced into the input compartment and the liquid phase is extracted along the channels from the output compartment, with the solid phase of the suspension left on the filter cloth.

As described in commonly owned U.S. Pat. No. 4,997,560, in order to clean such a filter the center panels of the filter plates are constituted as membranes that are sufficiently elastic or resilient that the plates of each compartment can be pushed toward each other to press the solid phase on the two filter cloths into a filter cake that can be back flushed or otherwise emptied from the machine. This forward deflection to compress the solid phase is effected by pneumatically or hydraulically pressurizing another compartment formed between the back face of the plate and a relatively rigid backing plate located immediately behind each filter plate.

PCT patent application PCT/EP91/01584 based on German 4,118,620 filed 6 Jun. 1991 by H. Bonn describes such a system where each membrane plate has a thickened outer edge or frame that sits in a groove of the rigid backing or support plate. An annular clip sits on each frame to retain it in place in the groove. This clip is a complex two-part item that must be perfectly set in order for the filter to function, in particular because the drain passages in part pass through the clip.

OBJECTS OF THE INVENTION

It is therefore an object of the present invention to provide an improved plate assembly for a filter press.

Another object is the provision of such an improved plate assembly for a filter press which overcomes the above-given disadvantages, that is which is of relatively simple construction, in particular with regard to the mounting of the membrane plate.

SUMMARY OF THE INVENTION

A filter-plate assembly has according to the invention a backing wall having an outwardly directed face and formed with an annular groove opening outward at the face and of a predetermined transverse width and a filter plate adjacent the wall and having an outer peripheral frame set in the groove and of a width substantially less than the width of the groove so as to define therewith an outwardly open annular gap. A generally planar central panel within the frame has a back face turned toward and forming a compartment with the wall and a front face turned away from the wall and adapted to be overlain by a filter cloth. In accordance with the invention a retaining bar is set in the space and braced transversely between the frame of the element and the backing wall.

Thus this simple retaining bar, which is a tight fit in a direction transverse to the direction the frame will have to move to leave the groove, effectively holds the frame in place. Since the frame is a loose fit in the groove, it is a very simple task to fit the plate to the rigid backing wall, unlike the prior art where the frame was a very tight fit and, hence, very difficult to fit in place. Once the at least partially elastomeric frame is in place, it is a simple matter to force in the retaining bar which is of much more rigid material.

The groove according to the invention has inner and outer flanks which converge outward. The frame has inner and outer faces that are parallel to the inner and outer flanks of the groove and one of which is spaced from the respective flank, the one flank normally being the outer flank. The retaining bar can have a retaining formation engaging into the one flank, for instance a bump or barb that fits into a complementary recess in the outer flank.

To ensure good sealing, a seal ring is set in the groove floor and outwardly engages the frame, or is set in the back face of the frame and inwardly engages the backing wall at the base of the groove.

According to another feature of the invention the bar is discontinuous and forms an empty gap in the space. The wall is formed with an outlet passage opening into the gap so that filtrate can be pumped from the passage. The bar and the frame together fill a cross section of the groove except at the drainage gaps.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
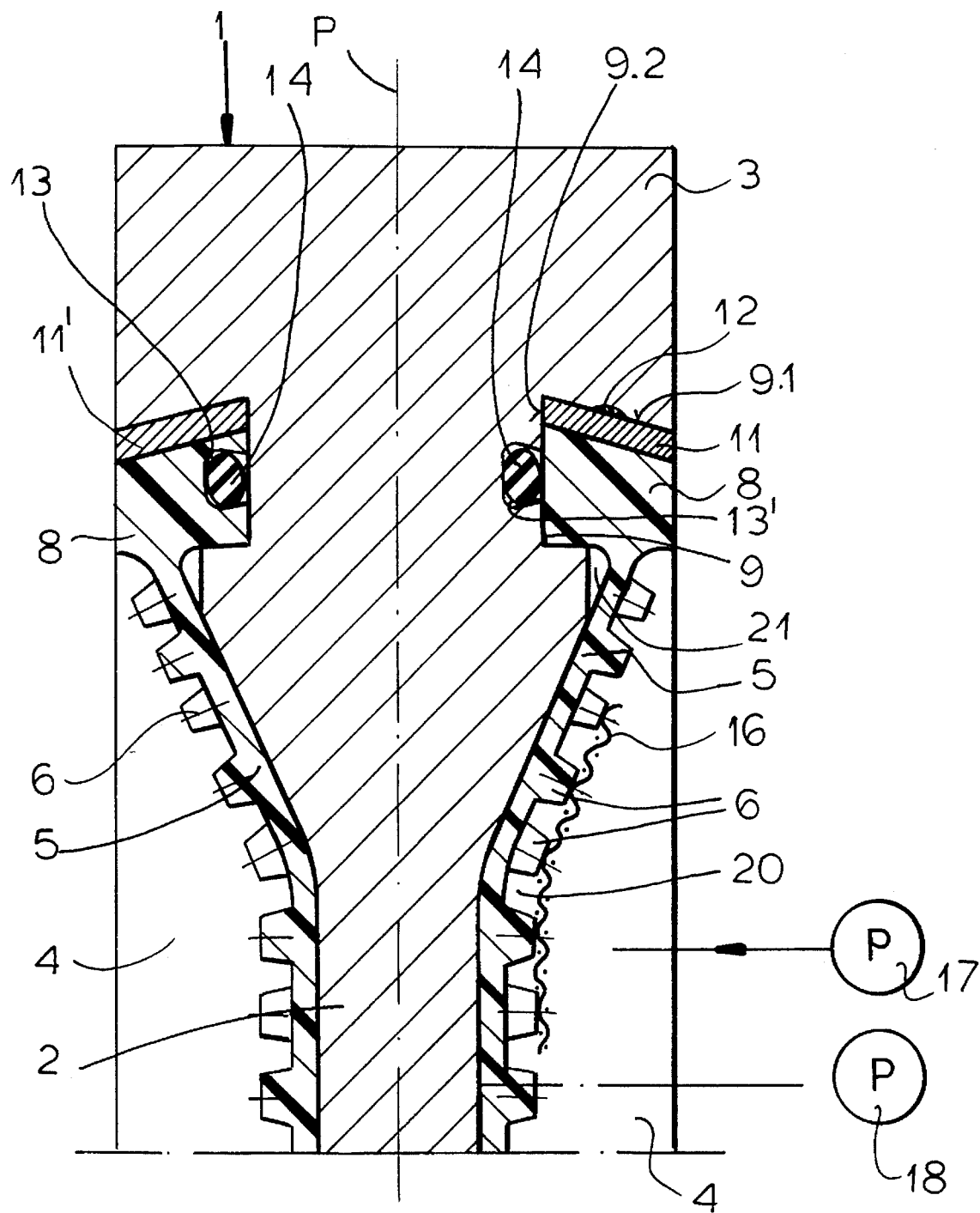
FIG. 1 is a partly diagrammatic cross-section through a filter-plate assembly according to the invention.
Figure 2:
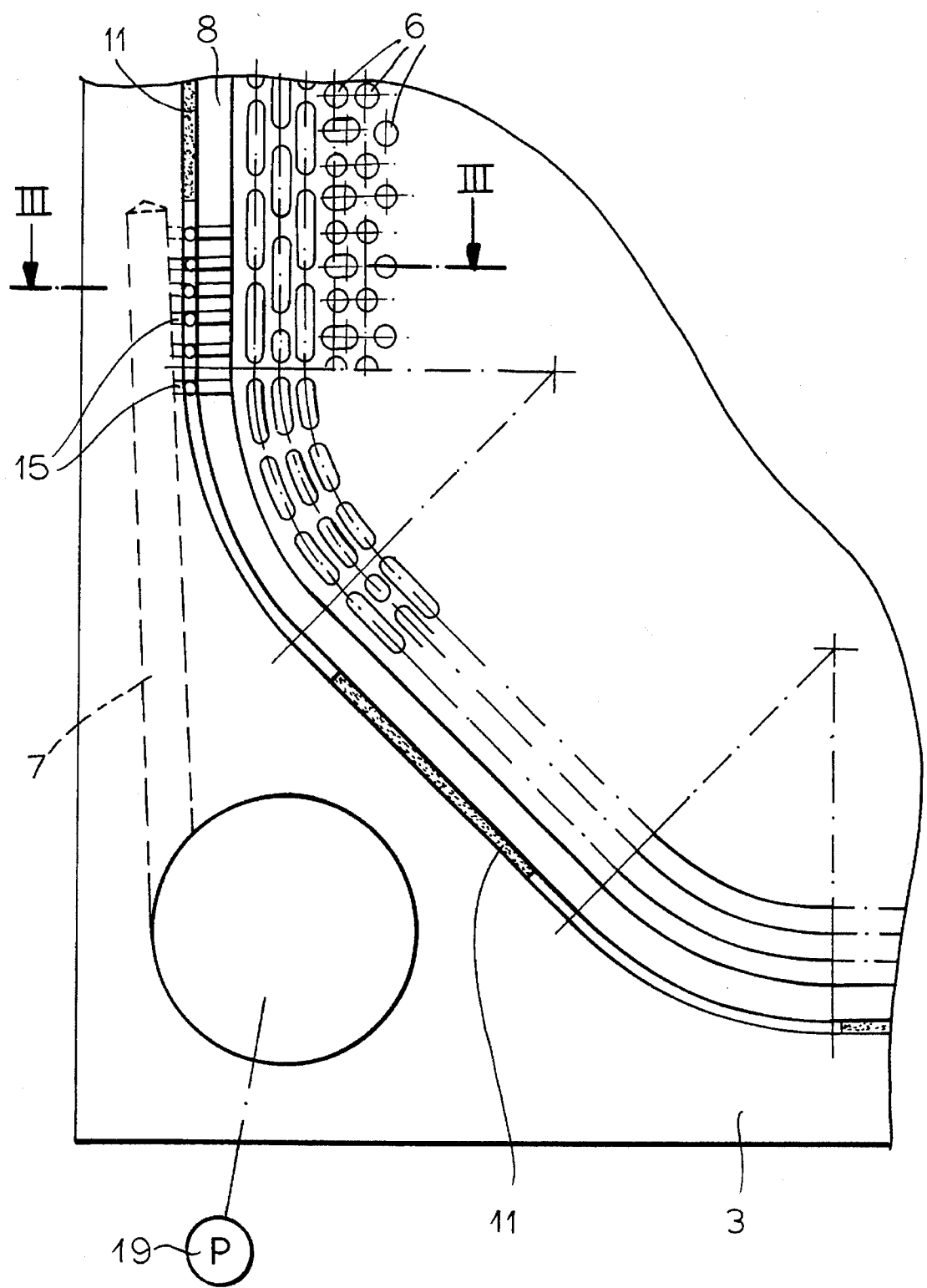
FIG. 2 is a front view of a portion of a plate assembly.

As seen in the drawing a filter-plate assembly for a filter press has a rigid backing plate 1 constituted of a relatively thin center wall portion 2 and a thick outer frame portion 3. Normally a plurality of such plates 1 are sandwiched together in a stack to form a plurality of intake compartments 4 that are fed a suspension to be filtered by means such as the pump illustrated in FIG. 1 at 17. Overlying the faces of the walls 2 are flexible filter plates or membranes 5 having bumps 6 directed outward into the compartments 4. A filter medium such as a cloth 16 lies on these bumps 6 and defines with the outer face of the membrane 5 an outlet compartment 20 that is drained by a pump 19 as described in more detail below. In this manner the liquid in the suspension fed in by the pump 17 passes through the cloth 16 and the solids are left behind on the cloth 16 as a filter cake.

A chamber 21 formed between the back face of the membrane 5 and the wall 2 can be filled with a fluid by a pump 18 to bow out the membrane 5 and compress the cake formed on the cloth 16 so it can be removed from the filter press. This operation is all substantially standard and is described in detail in the above-identified patent references.

According to the invention the membrane 5 is formed with a thickened outer edge or frame 8 that is of right-trapezoidal section and that is received in a similarly shaped annular groove 9 formed in the frame 3. The groove 9 has an outer flank 9.1 extending at an acute angle to a center plane P of plate 1 and a back wall 9.2 extending parallel thereto. The frame 8 of the membrane 8 has an outer face 8.1 that is spaced from and parallel to the face 9.1 to define a space 10 therewith and a back face 8.2 that lies flatly against the back face 9.2. This space 10 is filled along most of the perimeter around the membrane 5 by a rigid retaining bar 11 having a retaining bump 12 engaged in a recess formed in the face 9.1, although a bar 11' without such a bump 12 can also be used as shown to the left in FIG. 1.

Figure 3:
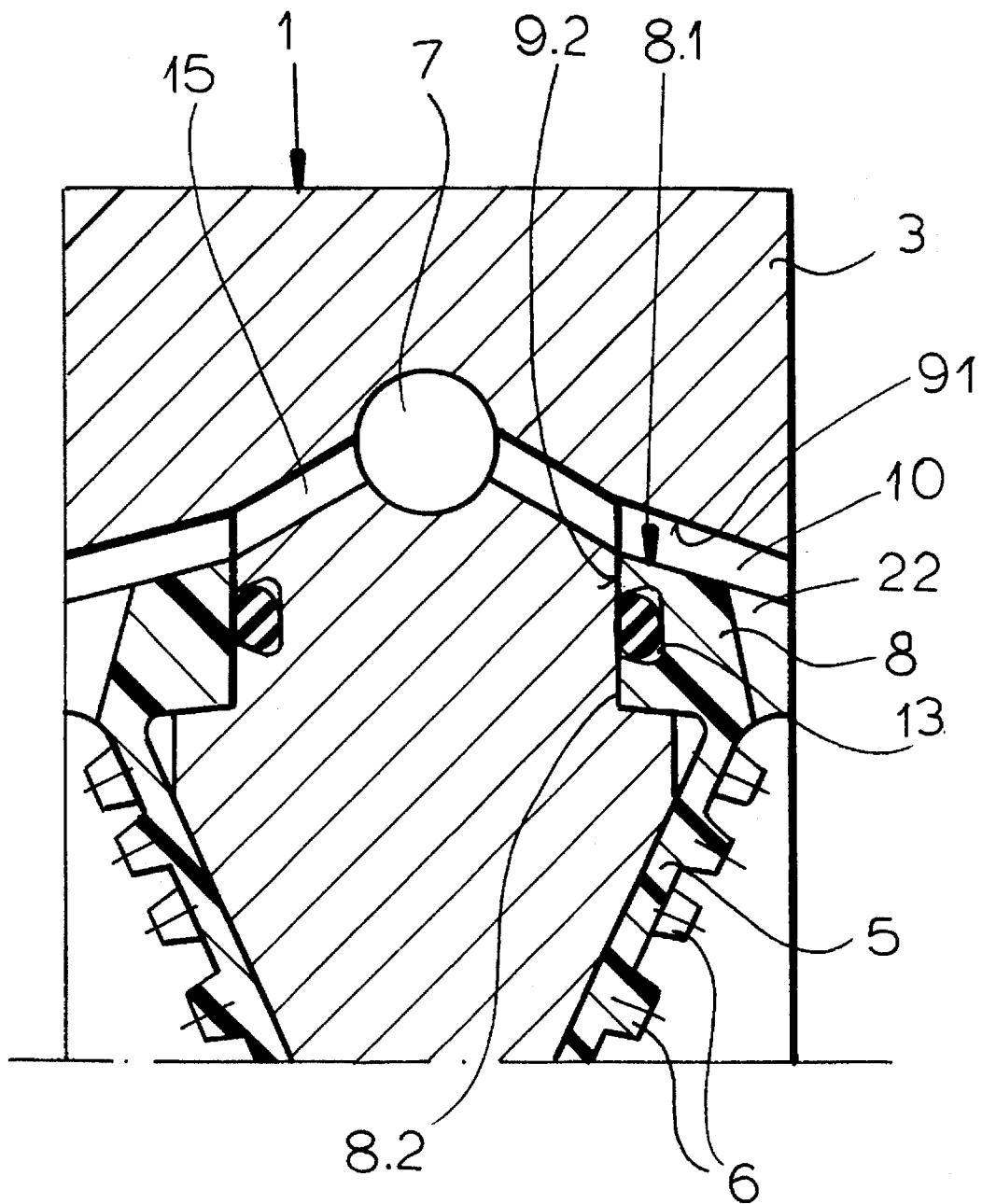
FIG. 3 is a cross section taken along line III—III of FIG. 2.

The outer frame 8 of the membrane 5 is formed with crosswise grooves 22 (FIG. 3) in regions where the space 10 is not filled by the bar 11. The plate 1 is formed with passages 15 opening into these open regions of the space 10 and leading to a manifold passage 7 that goes to the input of the drain pump 19. The cloth 16 extends over this region so that it is from here that the filtrate is pumped from the assembly.

It is possible as shown to the right in FIG. 1 for the rear wall 9.2 to be formed with a groove 13' in which is fitted an O-ring 14. Alternately, as shown to the left in FIG. 1 and in FIG. 3, the back face 9.2 of the rim frame 8 can be formed with a recess 13 receiving the O-ring seal 14.

With this system pressurization by the pump 18 of the chamber 21 is not likely to pop the rim 8 out of the groove 9 or to move it at all therein. To change the membrane plate 5 it is necessary first to pull out the bar or bars 11, whereupon the rim 8 can easily be removed from the groove 9.

I claim:

1. A filter-plate assembly comprising:

a backing wall having an outwardly directed face and formed with an annular and elongated groove opening outward at the face, having confronting inner and outer flanks, and of a predetermined transverse width;

a filter plate adjacent the wall and having
     an outer peripheral and annular frame set in the groove, having transversely oppositely directed inner and outer faces, and of a width substantially less than the width of the groove so as to define between one of the faces and the respective flank an outwardly open annular gap, and
     a generally planar central panel within the frame and having a back face turned toward and forming a compartment with the wall and a front face turned away from the wall and adapted to be overlain by a filter cloth; and a retaining bar set in the gap and braced transversely between the one face of the frame of the plate and the respective flank of the groove of the backing wall.

2. The filter-plate assembly defined in claim 1 wherein the groove flanks converge outward.

3. The filter-plate assembly defined in claim 2 wherein the frame inner and outer faces are parallel to the inner and outer flanks of the groove and the one face is spaced from the respective flank.

4. The filter-plate assembly defined in claim 3 wherein the flank spaced from the one face is the outer flank.

5. The filter-plate assembly defined in claim 3 wherein the retaining bar has a retaining formation engaging into the flank spaced from the one face.

6. The filter-plate assembly defined in claim 1 wherein the groove has an outwardly directed floor extending between the groove flanks and the assembly further comprises a seal ring set in the groove floor and outwardly engaging the frame.

7. The filter-plate assembly defined in claim 1 wherein the frame has an inwardly directed end face and the assembly further comprises a seal ring set in the end face and inwardly engaging the backing wall in the groove.

8. The filter-plate assembly defined in claim 1 wherein the bar is discontinuous and forms an empty gap in the gap, the wall being formed with an outlet passage opening into the gap, whereby filtrate can be pumped from the passage.

9. The filter-plate assembly defined in claim 1 wherein the bar and the frame together fill a cross section of the groove.

10. A filter-plate assembly comprising:

a backing wall having an outwardly directed face and formed with an annular groove
      opening outward at the face, of a predetermined transverse width, and having inner and outer outwardly converging flanks;

a filter plate adjacent the wall and having
      an outer peripheral and annular frame
        set in the groove,
        having inner and outer faces respectively confronting the inner and outer groove flanks, and
        of a width substantially less than the width of the groove so as to define therewith an outwardly open annular gap between one of the flanks and the respective face, and
      a generally planar central panel within the frame and having a back face turned toward and forming a compartment with the wall and a front face turned away from the wall and adapted to be overlain by a filter cloth; and a retaining bar set in the gap and braced transversely between the one flank and the respective face of the plate.

* * * * *